May 15, 1956

L. C. LIBERATORE ET AL 2,745,925

ADJUSTABLE THERMOMETER CONTROLLER

Filed June 9, 1954

2 Sheets-Sheet 1

INVENTORS
HARRY C. FISCHER
LAURENCE C. LIBERATORE
CHARLES B. TIBBITS
CLARENCE F. ALDRIDGE

BY P. J. Young, Jr.

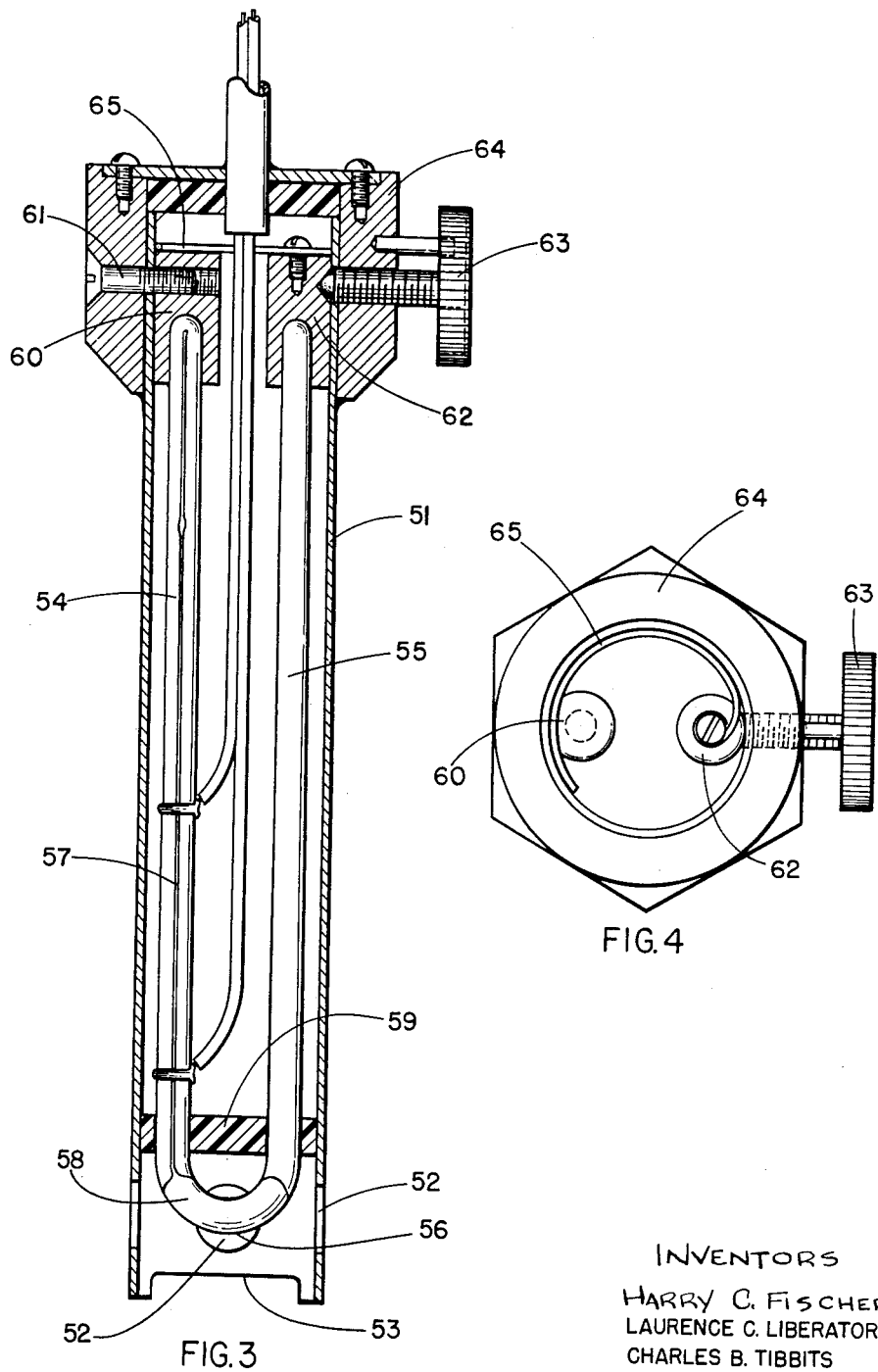

15, 1956

2,745,925
ADJUSTABLE THERMOMETER CONTROLLER

Laurence C. Liberatore, Rochester, N. Y., Charles B. Tibbits, Gahanna, Ohio, Clarence F. Aldridge, Pittsford, N. Y., and Harry C. Fischer, Canal Winchester, Ohio, assignors, by direct and mesne assignments, to Taylor Instrument Companies, Rochester, N. Y., a corporation of New York Application June 9, 1954, Serial No. 435,536

6 Claims. (Cl. 200—141)

This invention relates to thermometers and more particularly to an adjustable electric contact thermometer adaptable for employment as a temperature controller.

Heretofore, electric contacts have been sealed at predetermined points in the tubes or stem of glass thermometers so that they project into the tube bore whereby the mercury column on rising therein engages the contacts to complete various electric circuits to operate or control alarms and the like. However, most such thermometers known to applicants are unadjustable in that the circuits controlled thereby are always completed at the same or a fixed temperature. On the other hand, those prior art thermometers which are adjustable have disadvantages associated therewith such as the necessity of adding or subtracting the expansible fluid therein from the bulb-bore system in order to vary the temperature at which a circuit or circuits controlled thereby are completed.

It is therefore an object of this invention to provide a new and improved electric contact thermometer.

It is also an object of the invention to provide an electric contact thermometer which is continuously adjustable in the sense that adjustments may be manually accomplished without the necessity of adding or removing expansible fluid from the bulb-bore system thereof and independently of temperature changes.

The invention will be better understood from the following description when taken in connection with the accompanying drawings and the scope of the invention will be pointed out in the appended claims.

Figure 1:
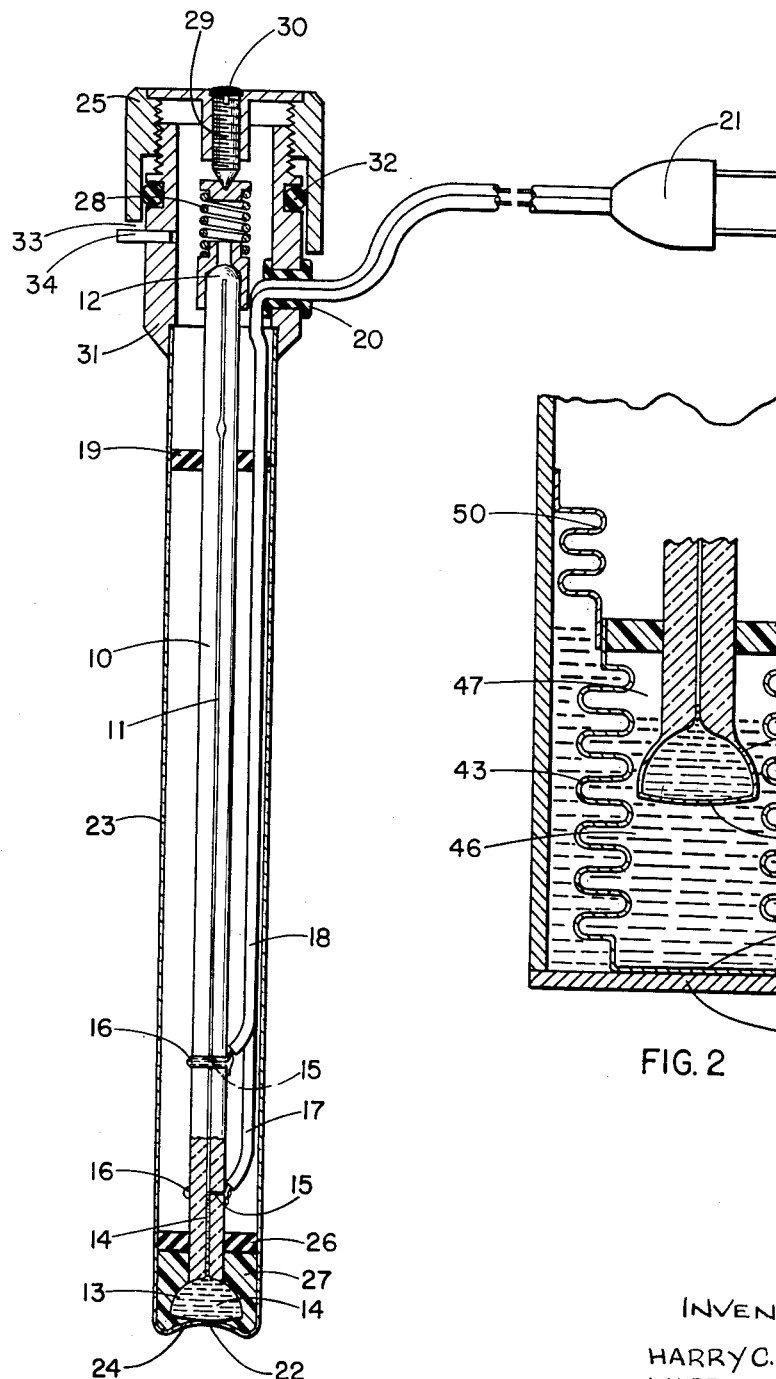
Figure 2:
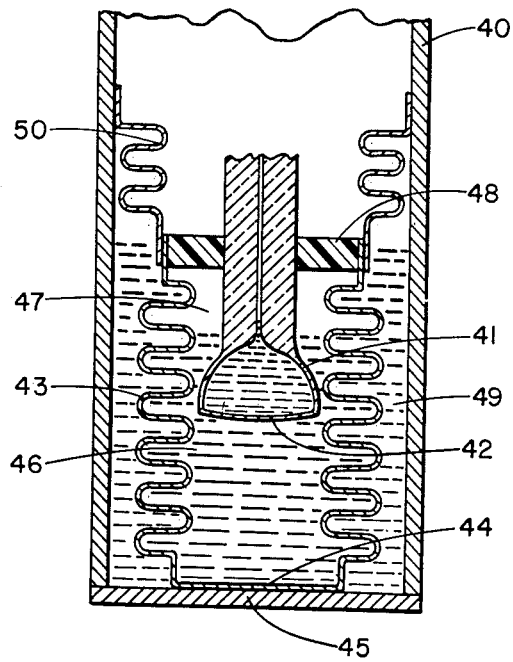

In the drawings, Fig. 1 is a side elevation view, partly in section, of a thermometer of the invention; Fig. 2 is an enlarged partial view similar to Figure 1 illustrating a modification of the invention; Fig. 3 is a side elevation view, partly in section, of a further embodiment of the invention and Fig. 4 is a top plan view of the Fig. 3 embodiment as seen with a cover provided therefor removed.

Referring now to Fig. 1 of the drawings, the device illustrated comprises a stem 10 of electric insulating material, such as glass, having a bore 11 therein closed or sealed at one end of the stem as at 12. The opposite end of the stem is provided with a reservoir or bulb 13 in communication with the bore 11. The reservoir contains a temperature sensitive electric conducting fluid 14 which, in response to temperature variations about the bulb, expands and contracts or rises and falls within the bore 11. So that expansion or contraction of the conducting fluid 14 may be effective to complete or interrupt a control circuit or circuits, two or more spaced electric conductors extending from the exterior through the wall of the stem into the bore thereof are provided.

A pair of such conductors, for example, have been illustrated in Fig. 1. The conductors are identical and each comprises a platinum wire, 15, for example, fused in the stem wall, in the case of glass, or otherwise suitably sealed in the case of other materials with one end of each wire projecting into the bore and path of the expansible conducting fluid to complete the circuit while the other end projects from the exterior of the stem. The exterior portion of each wire is, in turn, electrically connected to a collar 16 of conducting material encircling the stem and to which a pair of insulated electric conductors or leads 17 and 18 may be conveniently electrically connected as by solder. The leads pass through an upper retaining ring 19 of rubber or similar material and out of the casing through a grommet 20 while the outer ends thereof are connected to a plug 21 for convenient connection of the thermometer to a device whose operation is to be controlled, such as the ignition and fuel control motor of a furnace or the operating control circuit of a refrigeration compressor, for example. Of course, it will be understood that one of the thermometer conductors may be fused in the wall of the bulb or reservoir 13 with one or more of the conductors fused in the wall of the stem. The portion of the invention thus far described is more or less identical to prior art electric contact thermometers with the stem 10 either graduated in degrees or plain, in so far as the invention is concerned.

However, in accordance with this invention, the configuration and either the wall thickness of the entire reservoir or bulb 13 or a portion thereof is so proportioned that application of a force or pressure to the bulb will cause flexure of the walls or a portion thereof to effect variations in the volume within the bulb. More specifically, the bulb 13 is provided with a relatively thin and flexible wall portion 22 which, normally, is practically flat or is spherical with a relatively large radius as illustrated. In addition, a casing 23 having a closed end 24 and a removable cover or cap 25 is provided and the thermometer proper or stem and bulb is disposed in the casing with the flexible wall 22 in engagement with the closed end 24 of the casing. The casing 23 may be of any suitable material which is relatively rigid provided it will resist attack of particular materials and provided portions adjacent the closed end will readily transmit heat and cold. Stainless steel, for example, may be employed in a case where the temperature of the material being controlled is a liquid which must not be contaminated for sanitary reasons while in other cases steel, glass, copper, aluminum etc. may be employed.

The upper retaining ring 19 and a lower and similar retaining ring 26 of rubber or similar material are provided to maintain and position the glass stem within the casing 23.

In order to apply a finely controlled and adjustable force to effect flexure and variations in volume of reservoir or bulb 13, a force producing elastic or resilient means is provided and comprises a coil spring 28 interposed between the closed end 12 of stem 10 and one end of an adjustment screw 29 threadedly mounted in the hub portion 29 of cover or cap 25. Normally, screw 29 would be adjusted at the factory to set the zero adjustment of the device following which rotation of screw 29 with respect to cover 25 is prevented by means of cement 30 or equivalent. Cover 25 is threadedly mounted on end portion 31 of the case with a sealing O ring 32 therebetween to serve as a seal between the case and cover as illustrated. Otherwise, cover 25 is manually rotatable or adjustable with respect to the case or portion 31 thereof whereby various degress of pressure may be applied to spring 28.

Spring 28 biases the flexible wall 22 against the closed end 24 of case 23 and is responsive to variations in pressure applied thereto by manually adjustable cap 25, through screw 29, to vary the volume of the bulb reservoir and thereby adjustably move the temperature sensitive and conducting fluid within the stem bore 11 relative to the conductors 15. For example, if it is desired to energize a controlled device or complete a controlled circuit at a relatively lower temperature, the manually adjustable cap 25 is turned in one direction so as to further compress spring 28 whereupon the temperature sensitive conducting fluid 14 is moved upwardly in the bore 11 closer to the upper platinum contact 15. Conversely, if it is desired to employ the device to control at a relatively higher temperature, the manually adjustable cap 25 is turned in a reverse direction to relieve the biasing pressure on the flexible wall 22 whereupon the conducting fluid will drop downwardly within the bore away from the upper contact so that the bulb will have to be exposed to a higher temperature before the fluid will rise by expansion to engage the upper contact and complete the circuit. About 350° of the lower portion of cap 25 may be notched or removed as at 33 to facilitate rotation of cap 25 with respect to a pin or pointer 34 threadedly screwed into but otherwise fixedly mounted on the wall of portion 31 as illustrated. As will be understood, the side surface of cap 25 may be graduated around the periphery thereof for adjustably positioning the cap with respect to the pointer.

In Figure 2, we have illustrated a modification of our invention including a casing 40 similar to the casing 23 with a thermometer including bulb 41 having a flexible wall 42 disposed therein. However, in accordance with this modification, elastic or resilient means other than the spring 28 of the Figure 1 embodiment is provided. This means comprises a flexible or compressible bellows 43 of suitable material and having a closed end 44 in engagement with the closed end 45 of casing 40. The bellows may be entirely filled with an elastic or resilient fluid such as air or a gas having good temperature transfer properties. As illustrated, however, it is preferred to partially fill the bellows with a liquid 46 such as mercury or an organic liquid having desired temperature transfer properties leaving the balance of the volume within the bellows occupied by a suitable gas 47 such as air. The bulb 41, liquid 46 and gas 47 are hermetically sealed within the bellows by an impervious and rigid disk 48 of plastic or similar material, for example, sealingly fixed to the end of the bellows opposite the closed end 44 thereof and to portions of the thermometer stem adjacent the bulb 41 as illustrated.

The space between the bellows 43 and the casing 40 is occupied by a fluid 49 having good heat transfer properties such as mercury to insure good heat transfer from the casing 40 to the bellows 43. A partial or guide bellows 50 fixed to bellows 43 and either fixed to casing 40 or slidably engageable and movable with respect thereto substantially seals off the space containing the fluid 49 and otherwise serves as a lower guide for the thermometer, corresponding to guide 26 of the Figure 1 embodiment. With the exception of an adjustment screw, similar to screw 29 of the main embodiment, in more or less direct engagement with the upper closed end of the thermometer stem, the Figure 2 modification is otherwise similar to the Figure 1 embodiment.

In operation, upon manually turning the adjustment screw, the axial force thereby applied to the thermometer stem will be transferred to the bellows 43 to either compress it or permit expansion thereof, as the case may be. In response, the pressure of the elastic fluid within the bellows will thereby be varied to cause flexure of the flexible wall 42 of bulb 41 and variations in the volume thereof. As a result, the expansible conducting fluid in the bulb will be either moved upwardly in the bore of the stem closer to the upper contact or downwardly therefrom in the manner previously described in connection with the Figure 1 embodiment.

Like the Figures 1 and 2 embodiments, the embodiment of the invention illustrated by Figures 3 and 4 also includes a casing 51 having a number of openings or apertures 52 adjacent an open end 53 thereof. However, the thermometer proper comprises a U-shaped element having a pair of relatively rigid legs 54 and 55 interconnected by a curved base portion 56. Leg 54 comprises a stem of insulating material, such as glass, having a bore 57 therein in communication with a reservoir 58 provided in the interconnecting portion 56. As in the case of the Figures 1 and 2 embodiments, a pair of spaced contacts connected to conductors are also provided and the reservoir 58 contains a temperature sensitive fluid of conducting material. Otherwise, the leg 55 may be a solid stem of glass or other suitable material.

As shown, the U-shaped element is supported in the casing, with the portion 56 thereof adjacent the openings of the casing, by a resilient but nevertheless relatively rigid disk 59 of rubber or other suitable material. The upper or free end of leg 54 is confined within an opening in an element 60 which is immovably fixed to the casing 51 by a screw 61 so that the free end of leg 54 is thereby also immovably fixed with respect to the casing. On the other hand, the free end of leg 55 is confined within an opening of an element 62 which is movable with respect to the casing. Thus, an adjustment screw 63 threaded in the casing wall or in a collar or upper flange 64 thereon, as illustrated, may be employed to force element 62 and the free end of leg 55 away from the casing and toward fixed leg 54 against the natural tendency of leg 55 to spring back away from leg 54. In response to the application of such force by the adjustment screw 63, the volume of reservoir 58 is thereby reduced to force the temperature sensitive conducting fluid upwardly in the bore 57 closer to the upper contact. By virtue of the U-shaped configuration of the thermometer element in general, the curvature of interconnecting portion 56, the length of the lever arm presented by leg 55, etc., in particular, an elastic or resilient means is thus also incorporated in the Figure 3 embodiment. However, as distinguished from the embodiments of Figures 1 and 2, the elastic means of the Figure 3 embodiment normally applies a bias to reservoir 58 tending to increase its volume. Once the position of the column of temperature sensitive conducting fluid has been set in bore 57 by manual adjustment screw 63, it should not, of course, be permitted to be varied except by temperature changes about the reservoir 58. Therefore, to insure against such changes which might be caused by other external forces such as vibrations, a coil of spring material 65 may be mounted on element 62 as illustrated. As will be apparent, coil 65 provides an additional force firmly biasing element 62 against the end of adjustment screw 63.

While we have, in accordance with the patent statutes, shown and described particular embodiments of our invention and modifications thereof, it will be obvious that changes and modifications can be made without departing from the invention in its broader aspects and, we, therefore, aim in the appended claims to cover all such changes and modifications as fall within the true spirit and scope of the invention.

What we claim as new and desire to secure by Letters Patent of the United States is:

1. An adjustable electric contact thermometer comprising a rigid stem of insulating material with a bore therein and a bulb having a flexible wall in communication with said bore, a liquid of conducting material in said bulb, said liquid being movable by expansion and contraction within said bore in response to temperature variations, a conductor extending through the wall of said stem into the bore thereof, and means including said flexible wall for changing the volume of said bulb comprising an enclosing casing with said stem and bulb disposed therein, said casing having a closed end and a removable cover at the opposite end thereof, resilient means adapted to apply an external biasing force to said flexible wall and an adjustment screw threaded through said removable cover and adapted to vary said biasing force to change the volume of said bulb whereby said temperature responsive conducting liquid may be adjustably moved within said bore relative to said conductor.

2. An adjustable electric contact thermometer comprising a rigid casing closed at one end and having a removable cover at the opposite end thereof, a thermometer having a rigid stem of insulating material with a bore therein closed at one end of said stem and having a bulb in communication with said bore at the opposite end of said stem, a conductor extending through the wall of said stem into the bore thereof, said bulb having a flexible wall and containing a liquid of conducting material, said liquid being movable by expansion and contraction within said bore in response to temperature variations, said thermometer being disposed in said casing with said flexible wall of the bulb thereof in engagement with said closed end of said casing and means including said flexible wall for adjustably changing the volume of said bulb comprising threaded engagement of said removable cover with a portion of said casing for adjustable axial movement of said cover with respect thereto and an element of resilient material interposed between said cover and said closed end of said stem whereby said flexible wall may be adjustably biased against said closed end of said casing to manually vary the volume of said bulb and cause movement of said temperature responsive conducting liquid within said bore relative to said conductor.

3. An adjustable electric contact thermometer comprising a rigid stem of insulating material with a bore therein closed at one end of said stem and having a bulb in communication with said bore at the opposite end of said stem, a conductor extending through the wall of said stem into the bore thereof, said bulb having a flexible wall and containing a liquid of conducting material, said liquid being movable by expansion and contraction within said bore in response to temperature variations about said bulb, a rigid casing having a closed end, said stem being disposed in said casing with said flexible wall in engagement with said closed end thereof, and means including said flexible wall operative to vary the volume of said bulb and cause movement of said liquid therein within said bore relative to said conductor, said means comprising an adjustable element mounted on a portion of said casing and an elastic spring interposed between said adjustable element and said one closed end of said stem to adjustably bias said flexible wall against said closed end of said casing and thereby vary the volume of said bulb.

4. An adjustable electric contact thermometer comprising a rigid stem of insulating material with a bore therein closed at one end of said stem and having a bulb in communication with said bore at the opposite end of said stem, a conductor extending through the wall of said stem into the bore thereof, said bulb having a flexible wall and containing a liquid of conducting material, said liquid being movable by expansion and contraction within said bore in response to temperature variations about said bulb, a rigid casing having a closed end, a compressible bellows having relatively flexible side walls and a closed end in engagement with said closed end of said casing, bellows sealing means fixed to an end of said bellows opposite said closed end thereof and to portions of said stem adjacent said bulb, said sealing means hermetically sealing said bulb within said bellows normally in spaced relation to said closed end thereof, and means including said flexible wall of said bulb operative to vary the volume of said bulb and cause movement of said liquid therein within said bore relative to said conductor, said means comprising an adjustable element mounted on a portion of said casing and an elastic fluid contained in said bellows, said element being adjustably operative to apply an axial force to said one closed end of said stem to adjustably vary the compression of said bellows, said elastic fluid being operative in response to variations in compression of said bellows to effect flexure of said flexible wall of said bulb and cause variations in the volume thereof.

5. An adjustable electric contact thermometer comprising a stem of insulating material having a bore therein, a bulb in communication with said bore and having a flexible wall, a liquid of conducting material in said bulb, said liquid being movable by expansion and contraction within said bore in response to temperature variations about said bulb, an electric conductor extending through the wall of said stem into the bore thereof, a compressible bellows having a closed end and relatively flexible sides, bellows sealing means fixed to an end of said bellows opposite said closed end thereof and to portions of said stem adjacent said bulb, said sealing means hermetically sealing said bulb within said bellows normally in spaced relation to said closed end thereof, said bellows containing a fluid having temperature conductive characteristics, and means operative to vary the volume of said bulb to cause shifting movement of said liquid therein within said bore relative to said electric conductor, said means including stationary means engageable with said closed end of said bellows and movable means engageable with said stem and operative to cause movement of said bellows sealing means and said bulb relative to said closed end of said bellows, said temperature conducting fluid in said bellows being operative in response to said movement of said sealing means to cause flexure of said flexible wall of said bulb and thereby vary the volume therein.

6. An adjustable electric contact thermometer comprising a rigid stem of insulating material having a bore therein and a bulb having a flexible wall in communication with said bore, a liquid of conducting material in said bulb, said liquid being movable by expansion and contraction within said bore in response to temperature variations, a conductor extending through the wall of said stem into the bore thereof, an enclosure for said stem and bulb comprising a casing having a closed end and a removable end cover positioned at and for closure of the opposite end thereof, said stem and bulb being disposed within said casing, means including said ends of said casing and said flexible wall for changing the volume of aid bulb comprising resilient means disposed within said casing in axial alignment with the longitudinal axis of said stem and bulb and adapted to apply an external biasing force to said flexible wall, and adjustable threaded engagement of said removable end cover with said casing for adjustable axial movement of said cover with respect thereto whereby said biasing force may be varied to change the volume of said bulb and said temperature responsive conductive liquid may be adjustably moved within said bore relative to said conductor.

References Cited in the file of this patent
UNITED STATES PATENTS 2,127,159    Collins, 3d _____ Aug. 16, 1938
2,266,103    Van Guilder _____ Dec. 16, 1941